US007899894B2

(12) United States Patent
Carlson et al.

(10) Patent No.: US 7,899,894 B2
(45) Date of Patent: Mar. 1, 2011

(54) COORDINATED TIMING NETWORK CONFIGURATION PARAMETER UPDATE PROCEDURE

(75) Inventors: Scott M. Carlson, Tucson, AZ (US); Donald Crabtree, Port Ewen, NY (US); Dennis J. Dahlen, Rhinebeck, NY (US); Noshir R. Dhondy, Saugerties, NY (US); David A. Elko, Austin, TX (US); Michel H. T. Hack, Cortlandt Manor, NY (US); Georgette Kurdt, Wappingers Falls, NY (US); Denise M. Sevigny, Wappingers Falls, NY (US); Ronald M. Smith, Sr., Wappingers Falls, NY (US); David E. Whitney, Poughkeepsie, NY (US); Judith A. Wierbowski, Owego, NY (US)

(73) Assignee: International Business Machines Corporation, Armonk, NY (US)

(*) Notice: Subject to any disclaimer, the term of this patent is extended or adjusted under 35 U.S.C. 154(b) by 410 days.

(21) Appl. No.: 11/468,352

(22) Filed: Aug. 30, 2006

(65) Prior Publication Data
US 2008/0059655 A1    Mar. 6, 2008

(51) Int. Cl.
G06F 15/173 (2006.01)
G06F 1/00 (2006.01)
(52) U.S. Cl. .......................................... 709/223; 713/500
(58) Field of Classification Search ............... 714/12; 713/400, 375, 500, 503, 600, 401; 709/223
See application file for complete search history.

(56) References Cited

U.S. PATENT DOCUMENTS

| 4,894,846 | A | 1/1990 | Fine |
| 5,481,258 | A | 1/1996 | Fawcett et al. |
| 5,602,992 | A | 2/1997 | Danneels ............... 395/200.19 |
| 5,689,688 | A | 11/1997 | Strong et al. ................. 395/553 |
| 5,784,421 | A | 7/1998 | Dolev et al. ................... 375/354 |
| 5,812,749 | A | 9/1998 | Fernandez et al. |
| 5,848,028 | A | 12/1998 | Burklin |
| 5,925,107 | A | 7/1999 | Bartfai et al. |
| 5,968,133 | A | 10/1999 | Latham et al. |
| 6,173,023 | B1 | 1/2001 | Tanonaka et al. |

(Continued)

FOREIGN PATENT DOCUMENTS

WO    WO 0195550    12/2001

(Continued)

OTHER PUBLICATIONS

Kun Sun, Fault-Tolerant Cluster-Wise Clock Synchronization for Wireless Sensor Networks, Jul.-Sep. 2005, IEEE Transactions on Dependable and Secure Computing, vol. 2, No. 3, pp. 177-189.*

(Continued)

*Primary Examiner* — Nathan Flynn
*Assistant Examiner* — Chirag Patel
(74) *Attorney, Agent, or Firm* — John E. Campbell; Blanche E. Schiller, Esq.; Heslin Rothenberg Farley & Mesiti P.C.

(57) ABSTRACT

In a networked data processing system, the updating of timing parameters is carried out via a process in which the detection of the loss of communications with the network is not immediately employed as an indication of parameter invalidity but rather the process employs a system specific delay which permits actions such as server or link recovery to occur without necessitating the declaration of timing parameter invalidity.

20 Claims, 5 Drawing Sheets

U.S. PATENT DOCUMENTS

| | | | |
|---|---|---|---|
| 6,253,335 B1 | 6/2001 | Nakajima et al. | |
| 6,351,821 B1 * | 2/2002 | Voth | 713/600 |
| 6,535,491 B2 | 3/2003 | Gai et al. | |
| 6,606,362 B1 | 8/2003 | Daizell et al. | |
| 6,636,987 B1 * | 10/2003 | Ruffini | 714/12 |
| 6,697,382 B1 | 2/2004 | Eatherton | |
| 6,704,801 B1 * | 3/2004 | Minyard | 719/314 |
| 6,714,563 B1 | 3/2004 | Kushi | |
| 6,742,044 B1 | 5/2004 | Aviani et al. | |
| 6,748,451 B2 | 6/2004 | Woods et al. | 709/248 |
| 6,754,171 B1 * | 6/2004 | Bernier et al. | 370/216 |
| 6,760,316 B1 | 7/2004 | Hebsgaard et al. | 370/324 |
| 6,768,452 B2 | 7/2004 | Gilkes | |
| 6,819,682 B1 | 11/2004 | Rabenko et al. | 370/503 |
| 6,895,189 B1 | 5/2005 | Bedrosian | |
| 7,139,346 B2 | 11/2006 | Skahan, Jr. et al. | |
| 7,146,504 B2 * | 12/2006 | Parks et al. | 713/178 |
| 7,185,111 B2 | 2/2007 | Fulghum et al. | |
| 7,283,568 B2 | 10/2007 | Robie et al. | |
| 7,356,725 B2 | 4/2008 | Engler | |
| 7,394,802 B2 | 7/2008 | Jun et al. | |
| 7,395,448 B2 | 7/2008 | Smith | |
| 7,454,648 B2 | 11/2008 | Dahlen | |
| 7,475,272 B2 | 1/2009 | Carlson | |
| 7,496,606 B2 | 2/2009 | Hind et al. | |
| 7,535,931 B1 | 5/2009 | Zampetti et al. | |
| 7,539,777 B1 | 5/2009 | Aitken | |
| 7,571,268 B2 | 8/2009 | Kern et al. | |
| 7,617,410 B2 | 11/2009 | Check et al. | |
| 7,688,865 B2 | 3/2010 | Carlson et al. | |
| 7,689,718 B2 | 3/2010 | Carlson et al. | |
| 2002/0027886 A1 | 3/2002 | Fischer et al. | |
| 2002/0039370 A1 | 4/2002 | Elliot | 370/503 |
| 2002/0073228 A1 | 6/2002 | Cognet | |
| 2002/0078243 A1 | 6/2002 | Rich et al. | |
| 2002/0131370 A1 | 9/2002 | Chuah et al. | |
| 2002/0131398 A1 | 9/2002 | Taylor | 370/350 |
| 2003/0035444 A1 | 2/2003 | Zwack | |
| 2003/0048811 A1 | 3/2003 | Robie et al. | |
| 2003/0152177 A1 | 8/2003 | Cahill-O'Brien | |
| 2003/0235216 A1 | 12/2003 | Gustin | 370/509 |
| 2004/0073718 A1 | 4/2004 | Johannessen et al. | |
| 2004/0076187 A1 | 4/2004 | Peled | |
| 2004/0125822 A1 | 7/2004 | Jun et al. | |
| 2004/0167990 A1 | 8/2004 | Peer | |
| 2005/0020275 A1 | 1/2005 | Agrawala et al. | |
| 2005/0033862 A1 | 2/2005 | Blum | |
| 2005/0135429 A1 | 6/2005 | Bingham et al. | 370/503 |
| 2005/0169233 A1 | 8/2005 | Kandala et al. | 370/349 |
| 2007/0058491 A1 | 3/2007 | Dahlen et al. | |
| 2007/0086489 A1 | 4/2007 | Carlson | |
| 2007/0086490 A1 | 4/2007 | Carlson | |
| 2008/0028254 A1 | 1/2008 | Smith | |
| 2008/0059808 A1 | 3/2008 | Engler | |
| 2008/0072096 A1 | 3/2008 | Smith | |
| 2008/0072097 A1 | 3/2008 | Check | |
| 2008/0162984 A1 | 7/2008 | Kalra et al. | |
| 2008/0183849 A1 | 7/2008 | Carlson | |
| 2008/0183877 A1 | 7/2008 | Carlson | |
| 2008/0183895 A1 | 7/2008 | Carlson | |
| 2008/0183896 A1 | 7/2008 | Carlson | |
| 2008/0183897 A1 | 7/2008 | Carlson | |
| 2008/0183898 A1 | 7/2008 | Carlson | |
| 2008/0183899 A1 | 7/2008 | Carlson | |
| 2008/0184060 A1 | 7/2008 | Carlson | |
| 2008/0225897 A1 | 9/2008 | Bryant et al. | |
| 2009/0070618 A1 | 3/2009 | Dahlen et al. | |
| 2009/0257456 A1 | 10/2009 | Carlson et al. | |
| 2009/0259881 A1 | 10/2009 | Carlson et al. | |
| 2010/0049818 A1 | 2/2010 | Walker | |
| 2010/0100761 A1 | 4/2010 | Carlson et al. | |
| 2010/0100762 A1 | 4/2010 | Carlson et al. | |

FOREIGN PATENT DOCUMENTS

| | | |
|---|---|---|
| WO | 02/44877 A1 | 6/2002 |
| WO | WO 0244877 | 6/2002 |
| WO | 03/036395 A1 | 5/2003 |
| WO | WO 03036395 | 5/2003 |

OTHER PUBLICATIONS

Burbank et al. "The Network Time Protocol Version 4 Protocol Specification: draft-Ietf-ntp4-proto-02.txt", Internet Engineering Task Force, IETF, CH, vol. ntp, No. 2, Mar. 2006, pp. 1-40.

ISR dated Jun. 11, 2007 (PCT/EP2007/058910).

D. L. Mills, "Internet Time Synchronization: The Network Time Protocol", IEEE Transactions on Communications, IEEE Service Center, Piscataway, NY, US, vol. 39, No. 10, Oct. 1, 1991, pp. 1482-1493, XP000275311, ISSN: 0090-6778.

L.S. Liang, "Time Server in Advanced Automation Local Area Network", Computer Standards and Interfaces, Elsevier Sequoia, Lausanne,CH, vol. 6, No. 3, Jan. 1989,pp. 223-227, XP000112504, ISSN: 0920-5489.

Kadoch, Michel, "ATM Signalling: A Tutorial," Canadian Conference on Electrical and Computer Engineering—Congres Canadien En Genie Electrique Et Informatique, vol. 1, Sep. 5, 1995; pp. 420-423, XP000618815; p. 421-p. 422.

"z/Architecture Principles of Operation," IBM Publication No. SA22-7832-04, Fifth Edition, Sep. 2005.

"z/Architecture Principles of Operation," IBM Publication No. SA22-7832-05, Sixth Edition, Apr. 2007.

"z/Architecture Principles of Operation," IBM Publication No. SA22-7832-06, Seventh Edition, Feb. 2008.

International Search Report and Written Opinion for PCT/EP2008/050482 dated Apr. 24, 2008.

International Search Report and Written Opinion for PCT/EP2008/050524 dated May 27, 2008.

International Search Report and Written Opinion for PCT/EP2008/050620 dated May 13, 2008.

International Search Report and Written Opinion for PCT/EP2008/050726 dated Aug. 1, 2008.

International Search Report and Written Opinion for PCT/EP2008/050739 dated Sep. 11, 2008.

Office Action for U.S. Appl. No. 11/876,152 dated Oct. 15, 2009.

Office Action for U.S. Appl. No. 11/876,199 dated Oct. 26, 2009.

Office Action for U.S. Appl. No. 11/876,240 dated Oct. 26, 2009.

Final Office Action for U.S. Appl. No. 11/876,240 dated Mar. 19, 2010.

Office Action for U.S. Appl. No. 11/876,272 dated Oct. 16, 2009.

Office Action for U.S. Appl. No. 11/940,518 dated Oct. 15, 2009.

Final Office Action for U.S. Appl. No. 11/940,518 dated Apr. 2, 2010.

Office Action for U.S. Appl. No. 11/940,558 dated Sep. 3, 2009.

Office Action for U.S. Appl. No. 12/100,660 dated Jul. 8, 2010.

Office Action for U.S. Appl. No. 12/100,872 dated May 28, 2010.

U.S. Appl. No. 12/748,539 entitled "Channel Subsystem Server Time Protocol Commands," Carlson et al., filed Mar. 29, 2010.

U.S. Appl. No. 12/782,144 entitled "Server Time Protocol Control Messages and Methods," Carlson et al., filed May 18, 2010.

Office Action for U.S. Appl. No. 12/541,485 dated Oct. 12, 2010.

Office Action for U.S. Appl. No. 12/100,872 dated Nov. 17, 2010.

Neville, Iain, "IBM System Z Technical Conference," Apr. 2007, IBM Corporation.

Dhondy, Noshir, "Introduction to Server Time Protocol with IBM System and Technology Group," Oct. 9-13, 2006.

"Server Time Protocol for IBM Z9 System, zSeries 990 and 890; Non-Raised-Floor Support for System z9 BC," Oct. 2006.

* cited by examiner

| Message header | | | |
|---|---|---|---|
| Resp code | XTP Format | CTN Parameter Key | |
| Stratum | | Reserved | Reserved |
| CTN ID | | | |
| | | | |
| Msg Cmd Xmit Timestamp | | | |
| Msg Cmd Receive Timestamp | | | |
| Msg Resp Xmit Timestamp | | | |
| Msg Resp Receive Timestamp | | | |
| | | | |
| | | | |
| | | | |
| Reference Identifier | | | |
| | | | |
| XTP Format Dependent Data | | | |

Figure 3

COORDINATED TIMING NETWORK CONFIGURATION PARAMETER UPDATE PROCEDURE

TECHNICAL FIELD

The present invention is generally directed to the problem of time synchronization within and across a network of data processing systems. More particularly, the present invention is directed to a method for handling failures in communications between parts of the data processing network for which time synchronization is desired. Even more particularly, the present invention is directed to a method for coordinating the updating of information associated with synchronization within a network of data processing systems. It is thus a process which is ancillary to synchronization but which is not itself a time synchronization process.

BACKGROUND OF THE INVENTION

It is important to coordinate time related information across time-synchronized data processing systems in an effort to maintain synchronization of this information across all systems in a timing network without requiring dedicated connections amongst systems with those connections being used exclusively for timing. This time related information includes things such as: a Coordinated Time Network Identifier (CTN Id—this specifies the network in which synchronization is occurring), a Primary Reference Time (PRT) Source Identifier (which identifies the time source within the network), Leap Seconds Offset value, local time Information such as Time Zone (TZ) offset and Daylight Savings Time (DST) offset, and timing network configuration information. The present invention provides a means to accomplish this in an improved fashion when compared to current solutions.

In today's data processing network environments, it is extremely desirable to be able to make changes to any of this time related information at the same "instant" on all of the systems in a timing network. In order to maintain the coordination of these time parameters across the network, current solutions do not provide a means for a timing network node to lose communication with a clock source temporarily and to still guarantee that the timing system parameter information is still valid.

One of the systems that is used to provide timing synchronization and coordination of timing parameters used in synchronization is the IBM 9037 Sysplex Timer or ETR (External Time Reference). In this system the data processing systems in the network have a dedicated direct connection to the 9037 Sysplex Timer for the sole purpose of forwarding timing information to that system. In this system, directly attached data processing components continually monitor each individual timing related information field to determine if it has been updated. This involves the consumption of additional processing power at each node in the network to detect changes in the timing parameters. The timing information includes an ETR network identifier, the leap seconds offset and the total time offset, which is the sum of the time zone and daylight savings time offsets. Scheduled updates are viewed at the ETR console and not at each individual system in the timing network. Lastly, if a node loses all communication with the ETR, the parameter data is considered to be invalid at that point in time.

Another known approach to timing in networked systems is provided by the standard Network Timing Protocol (NTP) defined in RFC 1305. In general, except for a network identifier, the leap seconds offset, and a time source identifier, additional network parameter information is propagated throughout the network in specialized control messages that are separate from the actual time synchronization messages. Because the update is broadcast throughout the network once it has happened, the synchronization of when the updates occur across the network is subject to network delays which increase with distance between network nodes. Furthermore, the Network Timing Protocol is generic in that it is intended to be independent of the hardware on which it is employed.

SUMMARY OF THE INVENTION

In accordance with one of the embodiments of the present invention there is provided a method for updating timing parameters in a synchronized fashion in a networked data processing system having at least two servers. The method comprises the steps of selecting, at a first server in the network, at least one timing parameter to change. An information response packet is then constructed and it includes the parameter and a time at which it is to be changed. The packet is then broadcast to at least one other server in the network. It is then determined at the receiving servers whether it is in communication with a clock source. If it is determined that it isn't in communication, the server waits for a predetermined time and if the result is still negative, the server declares its timing parameters to be invalid.

In a further embodiment, a computer readable medium containing instructions thereon for carrying out the following steps in a networked data processing system having at least two servers is provided: selecting, at a first server in said network, at least one timing parameter to change; constructing an information response packet, at a first server, which packet includes said at least one timing parameter and a time at which it is to be changed; broadcasting the packet to at least one other server in the network; determining if said at least one other server is in communication with a clock source; and if the determining step produces a negative result, waiting for a predetermined time and if the result is still negative, declaring timing parameters at the at least one other server to be invalid.

Accordingly, it is an object of the present invention to provide a process by which timing parameters are synchronized in spite of a temporary loss of communications with one of the nodes in a networked data processing system.

It is also an object of the present invention to provide synchronization of timing parameters to servers (nodes) in a data processing network without the need for a dedicated signal line for the transmission of these values.

It is yet another object of the present invention to be able to provide for the situation in which communication with a server is lost for only a relatively brief period of time.

It is therefore a further object of the present invention to render more flexible the use of servers which are capable of rapid self repair and the use of data communications links which are likewise capable of recovery operations.

It is thus an additional object of the present invention to reduce the occurrences in which the loss of communications between servers results in the declaration of invalidity with respect to these timing parameters.

Lastly, but not limited hereto, it is an object of the present invention to provide a method step in which two independent, secure processing units are enabled to establish initial conditions for subsequent time parameter coordination.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 is a chart indicating the structure of the XTP message response format;

FIG. 9 is a diagram of the CTN-Parameter-Data Area of the Operation-Dependent-Data Area of the Message Response Block of the Read-CTN-Parameters STC command for a CTN Parameter Code of 0, which specifies that general CTN parameters are provided in the message response.

BEST MODE FOR CARRYING OUT THE INVENTION

The Coordinated Timing Network (CTN) parameter update procedure defines a method for updating the CTN parameters simultaneously in a timing network. The procedure uses timing message responses to broadcast the information throughout the timing network over existing system to system links. The information is broadcast from the stratum 1 server, that is, the server which is providing the source of time to the network. The procedure is typically initiated after hardening CTN parameter updates to handle situations where the stratum 1 server goes down after receiving a request to handle an update. The stratum 1 server initiates the procedure by sending the appropriate message format response to all connected systems in its timing network. This server identifies a CTN Parameter Key field as a quick means to determine if any changes to the CTN parameters were made by attached systems, as opposed to monitoring individual data fields continually for changes that occur. Since these changes are typically infrequent, this saves processing power on each timing message. Secondary servers then broadcast this same information to subsequent servers also using timing message responses.

Within specific control blocks that define the parameter to be changed is an additional field that holds a time value as to when the actual change is to occur. Because each system in the timing network now has the information available to it for a scheduled change, it is viewable by a user at each system in the network. The parameter update is actually made at each server at the scheduled time. The scheduled changes are packaged with the same messages used for time synchronization and are propagated to connected servers for a specified amount of time called the "CTN Maximum Freewheel Interval" (see below for this definition), so that if communication with the clock source is temporarily lost, the server can guarantee the validity of these parameter values for that freewheel period. If this period expires, the protocol utilizes an initialization procedure (Read CTN Parameters) to reestablish the value of these parameters and any scheduled changes that have been previously planned. In addition, if an immediate change is desired, it is treated as a scheduled change where the scheduled time is set to a small delta beyond the CTN Maximum Freewheel Interval, in order to obtain the synchronization of the change across the network by making sure each time a synchronized server (even those several hops away from the stratum 1 server which originates the change) receives the indication for the change prior to it actually occurring.

Figure 1:
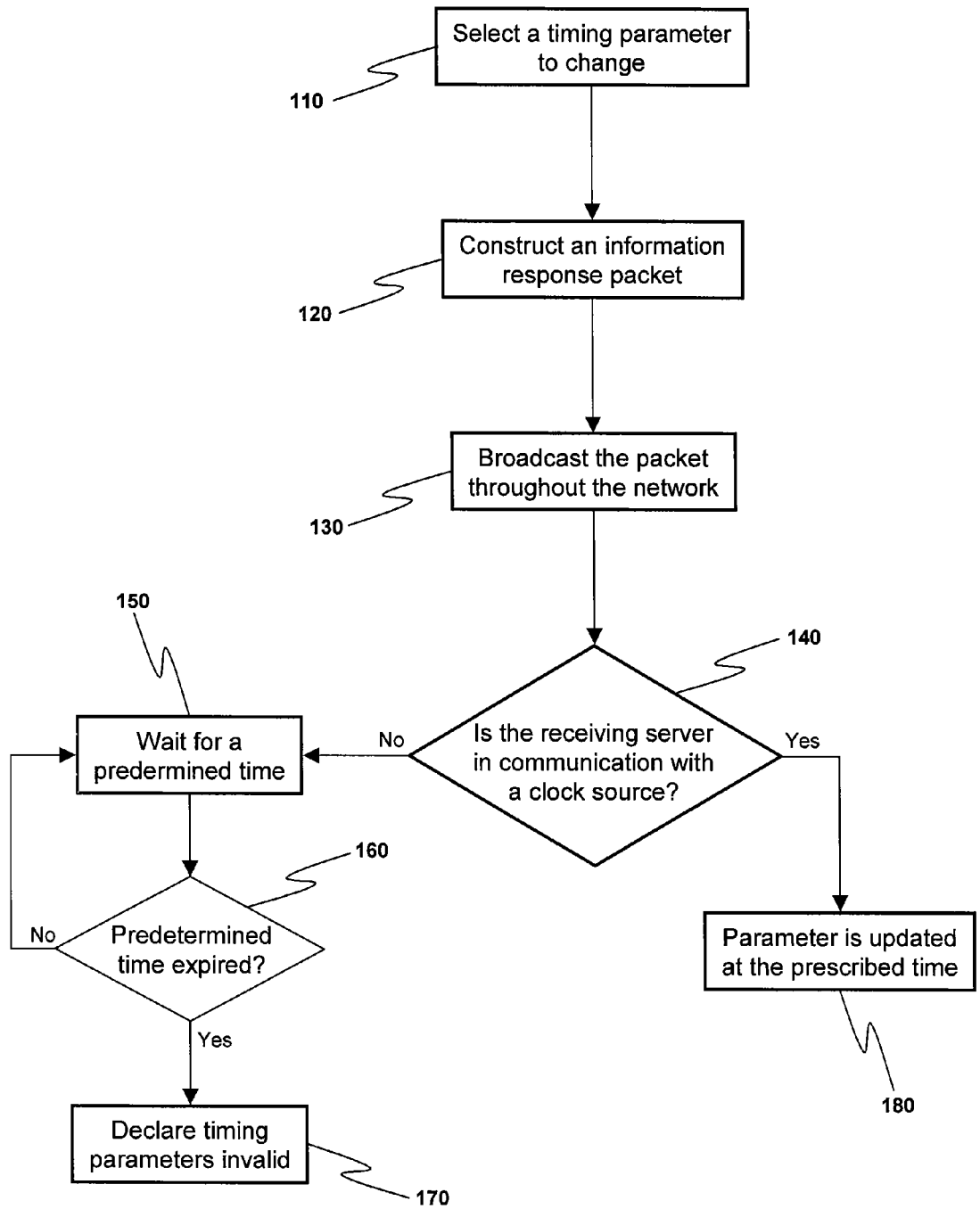
FIG. 1 is a flow diagram illustrating steps in the method of the present invention.

FIG. 1 illustrates an embodiment of the process provided by the present invention. In particular, the flow chart illustrates that in step 110, timing parameters whose changes are desired are selected. The process described herein updates one parameter at a time, but by providing control blocks with fields that describe multiple parameters to be changed, such a process is also easily provided. Response packets are then constructed (step 120) for holding the update information. See also especially FIG. 3 for a description of packet structure. FIG. 3 is particularly relevant in that it shows that the desired information is in the response packet. Also relevant here is that the structure includes not just the parameter to be updated but the time to perform the update, which can be immediately or equal to the freewheel interval plus the current time. The parameter for which updating is determined to be of use is then described in the defined packet (step 120). The packet is then broadcast to the other servers in the network which is identified by the CTN Id field (step 130). At the receiving server, it is determined whether or not communication with a clock source was lost (step 140). As indicated, this is usually accomplished by the periodic receipt of a timing message from a node in the network that is used as a clock source. Most importantly for the present invention, it is then determined if the loss of communication has persisted too long (steps 150 and 160). As used herein "too long" is defined in terms of what is referred to as the freewheeling time discussed in detail below. This freewheeling time is a parameter that is defined ahead of time for the network and that is a function of the maximum drift rate of the clock at a server with respect to the clock at that server's clock source. It is generally hardware specific. If it has indeed been too long, then the receiving server declares its timing parameters invalid (step 170). To proceed, it acquires new ones. It is this acquisition that the present invention seeks to avoid and does so in a great majority of the instances of data communication loss. If it has not been too long the timing parameters are still valid and the parameter is updated at the suggested future time on all the servers in the network (step 180).

The description of the method is further provided in greater detail below under the section titled "CTN Parameter Update Procedure" and the subsequent sections titled "Format-0 Update," "Format-1 Update," and "Format-2 Update." The format of the data is specified below in the section titled "XTP Message Response Definitions." Control block contents/layout are also be found below and in the drawings listed above and discussed below in their relevant contexts. The description of the "CTN Maximum Freewheel Interval" is an important concept in best appreciating the operation and advantages of the present invention.

Freewheel Mode

A secondary server enters freewheel mode when the attached server it has selected as its clock source stops providing timekeeping data. The server remains in freewheel mode until the server selects another attached server as its clock source or until the server enters the no-usable-clock-source state.

A server that is in freewheel mode is said to be "freewheeling." The specific time at which a server enters freewheel mode is referred to as the freewheel-start time.

Server Freewheel Interval

While in the freewheel mode, the CST dispersion increases at a rate equal to the maximum skew rate for the server. The server freewheel interval is the period of time that a server can be in freewheel mode. The total amount of time that a server can freewheel is based on the synchronization threshold, CST dispersion, CST offset and maximum skew rate and can be calculated as follows:

Server freewheel interval=(sync check threshold−CST dispersion−|CST offset|)/maximum skew rate In the above, the vertical bars represent absolute value.

Server Maximum Freewheel Interval

The server maximum-freewheel interval (SMFI) is equal the maximum possible amount of time a secondary-time server can be in freewheel mode. The value is calculated assuming a CST dispersion and CST offset of zero and is equal to the synchronization-threshold value divided by the maximum-skew rate for the server.

CTN Maximum Freewheel Interval

The CTN maximum-freewheel interval (CMXFI) is equal to the maximum SMFI of any server in the CTN. The CMXFI dictates the minimum amount of time that a CTN parameter update must be broadcast by the stratum-1 server.

CTN Minimum Freewheel Interval

The CTN minimum-freewheel interval (CMNFI) is equal to the minimum SMFI of any server in the CTN.

STP Messages

CTN parameters are set and read by an operator via an STP console interface. CTN parameters include: server connectivity, local time information, such as time zone and daylight savings time, and the leap seconds offset. The console itself is any element that provides an operator interface to display and set CTN parameters, and that has the capability to communicate with the STP facility using the console interface. The console also provides read and write access to non-volatile disk storage. Console disk storage provides the means for the STP facility to initialize configuration and timing parameters, and to save changes to the parameters such that they are preserved through a power-on-reset (POR).

STP (Server Time Protocol) messages are transmitted over STP paths between two servers in the form of a message command and a message response. A message command is sent from a server to an attached server; an XTP message response is sent from a server to an attached server in response to a message command received from the attached server. The message response is sent to the attached server on the link that the message command was received.

The server sending a message command is referred to as the message originator; the server receiving a message command is referred to as the message recipient.

A message command contains a 2-byte message command code that indicates the type of message being transmitted. As indicated above, the following STP message command codes are supported:

Exchange Time Parameters (XTP) message: X'1001'
STP Control (STC) message: X'1002'

Exchange Time Parameters Message

The Exchange Time Parameters (XTP) message is used to exchange timestamps, timekeeping information and CTN-parameter information between two directly attached servers. The information in the message response is used by the message originator to calculate the roundtrip delay, offset, and dispersion values that are used by STP clock filtering and selection algorithms to select a clock source. It is also used to set CTN timekeeping parameters, which is the aspect of this exchange which is relevant to the present invention.

The XTP-transmit procedures are used to transmit XTP message commands and the XTP-receive procedures are used to receive XTP messages.

XTP Message Command

Figure 2:
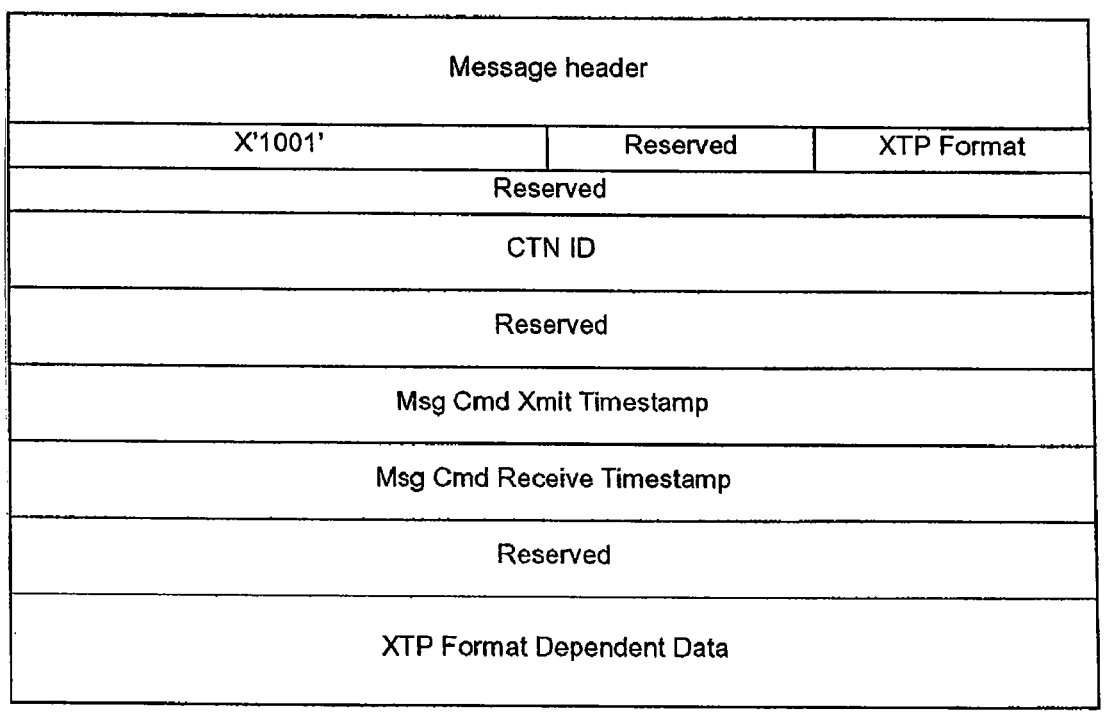
FIG. 2 is a chart indicating the structure of the XTP message command format.

The STP facility at the server sending an XTP message command sets all fields in the message command except for the message-command-receive timestamp field. The message-command-receive-timestamp field is set by the server receiving the message command at the time the message is received. All other fields are set by the STP facility at the server originating the message at the time the message is sent. Certain parameters are obtained from the attached-server state information associated with the attached server that is to receive the XTP message command. The XTP Message Command Format is illustrated in FIG. 2.

Message Command Definitions

Message Header: Words 0-3 contain information that is dependent on the type of data link that is used to implement the STP link.

Command Code (CC): Bytes 0-1 of word 4 contain X'1001' to indicate an XTP message command.

Reserved: Byte 2 of word 1, words 5, 9-13 and 18-19 are reserved and are set to zero.

XTP Format: Byte 3 of word 4 contains an 8-bit value that specifies the format of the format-dependent-area in the message command. The value is set to zero for message commands.

CTN ID: Words 6-8 are set to the CTN ID of the server sending the message command.

Message Command Xmit Timestamp: Words 14-15 are set from the time-of-day (TOD) clock at the server at the time the message is transmitted over the STP path by the server.

Message Command Receive Timestamp: Words 16-17 are set to the time at which the message command was received by the attached server. The field is set from the TOD clock at the attached server when the message command is received. At the time the message command is transmitted, the field is undefined.

Format Dependent Data: Set to zeros.

XTP Message Response

The STP facility at the server originating the XTP message response sets up all message fields described below except for the message-response-receive timestamp field. The message-response-receive-timestamp field is set by the receiving server when the message response is received. All other fields are set up by the STP facility at the server originating the message response at the time the message is sent. Certain parameters are obtained from the attached-server state information associated with the attached server that is to receive the XTP message response. Three formats are defined for XTP message responses:

Format-0 XTP Message Response: the format-0 message response is used to deliver the following general CTN parameter information:

New CTN ID;

PRT Correction Steering Information Block;

Leap Second Offset Information Block;

Total-time offset.

Format-1 XTP Message Response: the format-1 message response is used to deliver a new stratum-1-configuration and, if specified, a new CTN ID.

Format-2 XTP Message Response: the format-2 message response is used to deliver the following time control parameter information:

Timezone Control Parameter Information Block

The format used for an XTP-message response by a primary-time server is dependent on whether a CTN-parameter update is in progress. If an update is in progress, the primary-time server uses the format that contains the parameter being updated. When a CTN-parameter update is not in progress, the format-0 XTP message response is used in all responses.

The format used for an XTP-message response by a secondary-time server is dependent on whether the server has a clock source. When the server has a clock source, it uses the same format as that provided in the last valid response from the clock source. When the server does not have a clock source, it uses the format-0 response.

XTP Message Response Format

The XTP message response format is illustrated in detail in FIG. 3. Fields that are not relevant to the present invention are not labeled. Field sizes throughout are a matter of design choice to fit particular implementations.

XTP Message Response Definitions

Message Header: Words 0-3 contain information that is dependent on the type of data link that is used to implement STP links.

Response Code (RC): Byte 0 of word 4 is a 1-byte binary integer that describes the results of the attempt to execute the message response. The valid codes are defined in the table below:

TABLE I

| Hex Code | Meaning |
|---|---|
| 01 | Successful: the message command was successfully performed. |
| 02 | STP Not Enabled: the STP facility is installed but not enabled at the attached server. |
| 05 | Configuration error: the message command contains a mismatched CTN ID. |
| 06 | Path Not Established: the path is not established at the attached server. |
| FE | CF Response: the response codes indicate that the STP facility is not supported at the attached server. |
| FF | Reserved. |

Reserved: Bytes 1-2 of word 5, byte 3 and bits 25-31 of word 5 are reserved and set to zero.

XTP Format: Byte 1 of word 4 specifies the format of the format-dependent-area in the message response. Valid values are 0, 1 and 2.

CTN Parameter Key (CPK): Bytes 2-3 of word 4 contain a 2-byte unsigned integer that is used to indicate whether the contents of the format-dependent data have changed. The active-stratum-1 server increments the CPK whenever it changes the format used in XTP-message responses or when it changes any value in the data sent in the format-dependent-data area. A secondary-time server sets the CPK to the CPK value it received in the last XTP-message response from its current clock source or, if it does not have a clock source, to the same value it sent in its last XTP-message response. The initialized value is zero and the field wraps to zero.

Stratum: Byte 0 of word 5 is set to the stratum level of the server sending the message response.

CTN ID: Words 6-8 are set to the CTN ID of the server sending the message response.

Message Command Xmit Timestamp: Words 10-11 are set to the incoming-message-command transmit timestamp.

Message Command Receive Timestamp: Words 12-13 are set to the incoming-message-command-received timestamp.

Message Response Xmit Timestamp: Words 14-15 are set from the TOD clock of the server sending the message response at the time the message is transmitted.

Message Response Receive Timestamp: Words 16-17 contain the timestamp of the time at which the message response was received by the attached server. The field is set from the TOD clock at the server receiving the message response when the message response is received.

Reference Identifier: Words 24-31 are set to the CST-reference ID at the server sending the message response.

Figure 4:
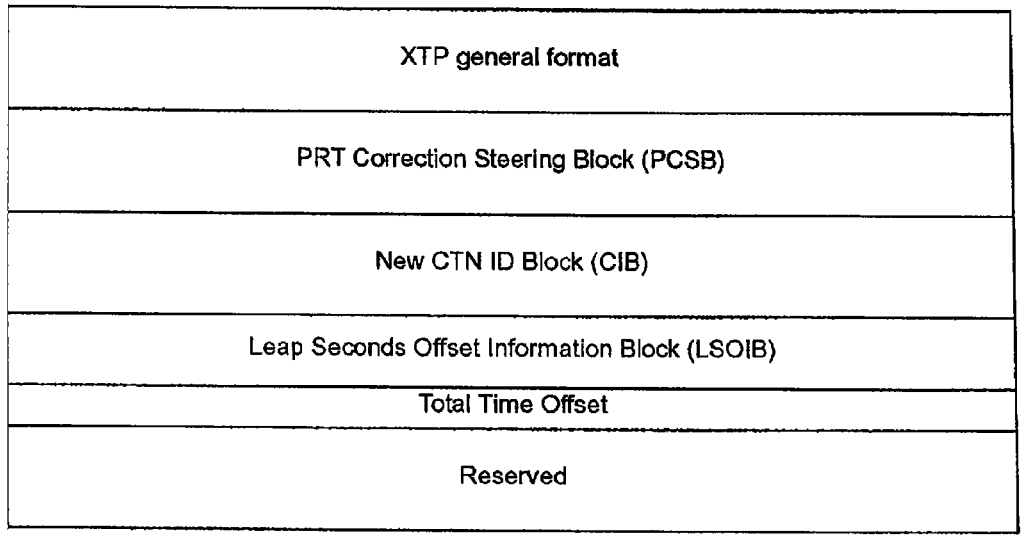
FIG. 4 is a chart indicating the structure of a message response Format-0 data.

Message Response Format Dependent Data: Words 34-63 are set based on the format field as described below Message Response Format-0 Data: See FIG. 4. The parameters shown are discussed below.

Figure 5:
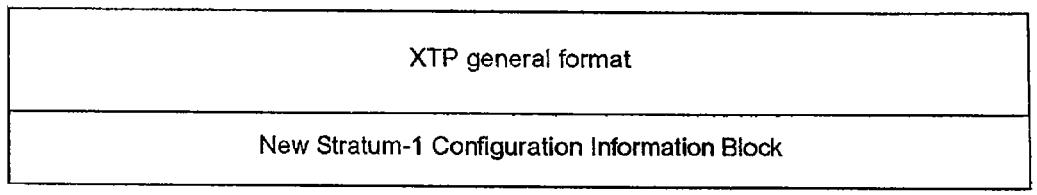
FIG. 5 is a chart indicating the structure of a message response Format-1 data.

Message Response Format-1 Data: See FIG. 5. The parameters shown are discussed below.

Figure 6:
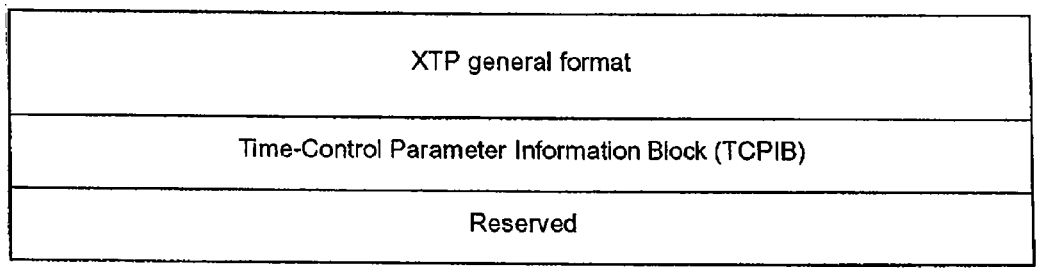
FIG. 6 is a chart indicating the structure of a message response Format-2 data.
Figure 7:
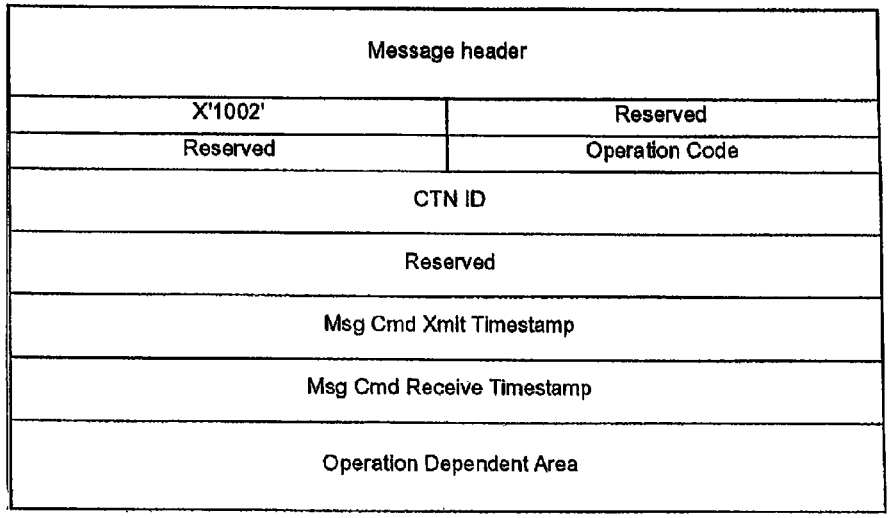
FIG. 7 is a chart indicating the structure of the STC command message command format"—where "STC" stands for "STP Control" command, as opposed to the "XTP" ("Exchange Time Parameters") command.

Message Response Format-2 Data: See FIG. 6. The parameters shown are discussed below.

The Read CTN Parameters function is used to initialize the local server to the "current" system parameters of the network so that it may join the network. Because the amount of data is larger than can be obtained in one packet, multiple requests are raised to gather the information. A loop through all of the parameters is performed.

On the first request, the CTN Parameter key is stored; and when the last packet is obtained, its CTN Parameter key is compared with that of the first request. If the keys are not equal, a parameter was changed during this procedure and it is started again. If the keys are equal, then the "current" system parameter is valid and the server may now join the network.

The read-CTN-parameters operation reads CTN parameters from the attached server. The CTN parameters that are to be returned are specified in byte 0 in the message command operation-dependent area.

CTN Parameter Code: byte 0 of word 0 specifies the CTN parameters to be returned in the message response as defined below:

TABLE II

| Hex code | Meaning |
| --- | --- |
| 0 | Read general CTN parameters. |
| 1 | Read new stratum-1 configuration information. |
| 2 | Read time zone info. |
| 3 | Read current stratum-1 configuration information. |
| 4-FF | Reserved |

The valid response codes for the operations are as follows:

TABLE III

| Hex code | Meaning |
| --- | --- |
| 01 | Successful: the message command was successfully performed. |
| 02 | STP Not Enabled: the STP facility is installed but not enabled at the attached server. |
| 03 | Busy: the message command cannot be performed at this time due to busy conditions or resource contention. |
| 04 | Invalid operation parameters: the message command contains invalid parameters. |
| 05 | Configuration error: the message command contains a mismatched CTN ID. |
| 06 | Path Not Established: the path is not established at the attached server. |
| FE | CF Response: the response codes indicate that the STP facility is not supported at the attached server. |
| FF | Reserved. |

Figure 8:
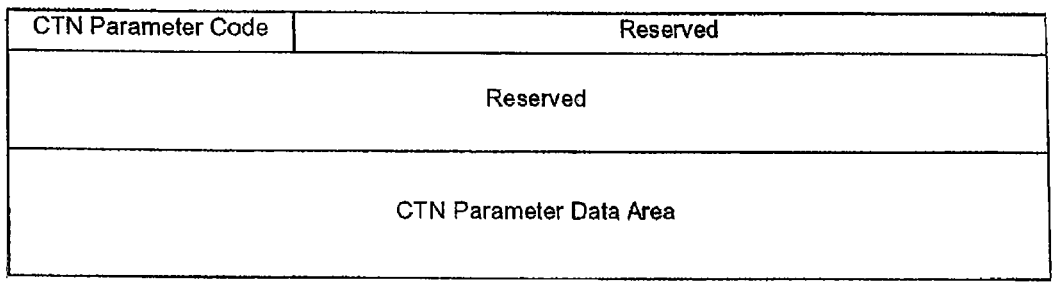
FIG. 8 is a chart indicating the structure of the Operation-Dependent-Data Area of the Message Response Block of the Read-CTN-Parameters STC command.

When a response code of X'01' is returned, the operation-dependent area of the message response block has the format shown in FIG. 8.

CTN Parameter Code: byte 0 of word 0 of the message-response operation-dependent area specifies the CTN parameters that are provided in the message response as defined below:

TABLE IV

| Hex code | Meaning |
| --- | --- |
| 0 | General CTN parameters provided in the message response. |
| 1 | New Stratum-1 configuration information block provided in the message response. |
| 2 | TCPIB provided in the message response. |
| 3 | Current Stratum-1 configuration information block provided in the message response. |
| 4-FF | Reserved |

CTN Parameter Key: bytes 2-3 of word 0 contain the CTN-parameter key for the server.

Figure 9:
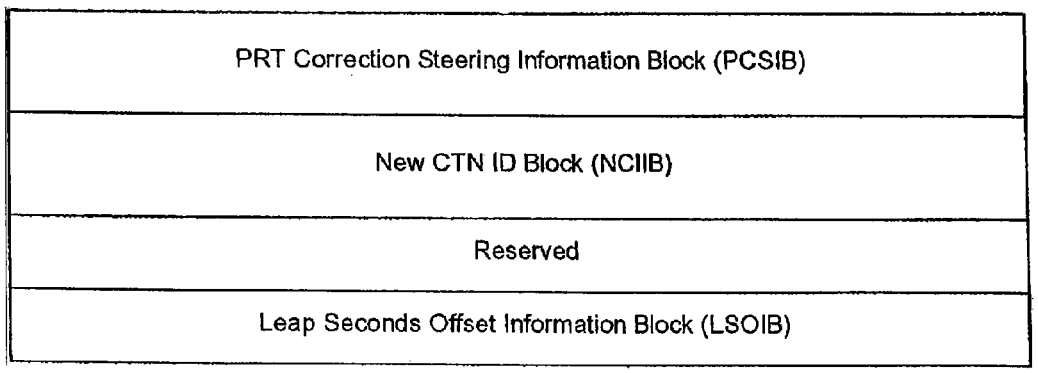
FIG. 9 is a chart indicating the structure of the General CTN Parameters Data Area. That is.

CTN Parameter Data Area: the content of CTN-parameter data area depend on the CTN parameter code in the message response and are as shown below. All unspecified words in the operation dependent data area are undefined. The structure of the General CTN Parameters Data Area is shown in FIG. 9.

PRT Correction Steering Information Block (PCSIB): words 0-15 contain the PCSIB for the server.

New CTN ID Information Block (NCIIB): words 16-21 contain the new CIIB for the server.

Reserved: Words 22-23 are reserved and set to zero.

Leap Second Offset Information Block (LSOIB): Words 24-27 contain the LSOIB for the server.

New Stratum-1 Configuration Information Data Area

New Stratum-1 Configuration Block: Words 0-29 contain the new-stratum-1-configuration block for the server TCPIB Data Area Timezone-Control Parameter Information Block (TCPIB): words 0-23 contain the TCPIB for the server.

Current Stratum-1 Configuration Information Data Area

Stratum-1 Configuration Block: words 0-26 contain the stratum-1-configuration information block for the server.

XTP Transmit Procedures

The XTP-transmit procedures are used to transmit an XTP-message command or an XTP-message response as defined below.

Message Command Transmit

The XTP-message-command-transmit procedure is used to transmit the Exchange Time Parameters (XTP) message command to a specified attached server. The STP path that is used to transmit the message is determined using a model-dependent STP-path-selection procedure.

Initiative to issue an XTP-message command is established when the message-interval timer for an attached server expires. The message-interval parameter for the attached server specifies the rate at which XTP-message commands are sent to the attached server.

The XTP-message-command-transmit procedure builds the message header, sets the message command code equal to the XTP-command code and builds the remainder of the XTP-message command. Immediately prior to sending the message, the message-command-transmit timestamp in the message command is set equal to the current TOD clock and the command is transmitted over the selected STP path.

Message Response Transmit

The message-response transmit procedure is used to transmit an XTP-message response following receipt of an XTP-message command. The procedure builds the message-response header, sets the message-response code and builds the remainder of the XTP-message response. Immediately prior to sending the message, the message-response-xmit timestamp in the message response is set equal to the current TOD value and the response is transmitted on the STP path over which the message command was received.

XTP Receive Procedures

The XTP-receive procedures are used to receive an XTP-message command or an XTP-message response as defined below.

Message Response Receive

The XTP-message-response receive procedure is invoked each time an XTP message response is received on an STP path. If the server is in the synchronized state, the data in the format-dependent data of the most recent valid timekeeping message response is checked for updates and, if detected, the data is used to update the server's CTN parameters. It is noted, however, that the data from the most recent valid timekeeping message response are used to update the server's CTN parameters only if the responding server—that is, the server that returned the message response—is this server's clock source.

Message Command Receive

The XTP-message-command receive procedure is invoked each time an XTP message command is received on an STP path. The procedure checks for STP path errors and if an error is detected, error-recovery procedures are invoked. If no STP path errors are detected, the procedure stores the incoming-message-command timestamp data from the message command into the timestamp data for the attached server and performs the XTP-message-response transmit procedure to send a message response.

CTN Parameter Update Procedure

The CTN-parameter-update procedure is used to update CTN parameters at all servers in a CTN. The procedure makes use of XTP message responses to broadcast the information throughout the CTN.

In an STP-only CTN, only the server designated as the active-stratum-1 server initiates the CTN-parameter update procedure. A secondary-time server requests that the active-stratum-1 server initiate a CTN parameter update by sending an update-request control message to the active-stratum-1 server.

In a mixed CTN, all stratum-1 servers may initiate the CTN-parameter-update procedure.

A stratum-1 server initiates the update-procedure only after the server has updated its local CTN parameters and has stored the update parameters onto console disk storage.

A CTN-parameter update is not performed for parameters that already have a scheduled update and the update time is within the CTN maximum-freewheel interval of the current time. A busy response is returned to console commands requesting a CTN-parameter update that occur during this period.

Three types of CTN-parameter updates formats are defined:

Format-0 update—data described for the format-0 XTP message response is to be updated.

Format-1 update—data described for the format-1 XTP message response is to be updated.

Format-2 update—data described for the format-2 XTP message response is to be updated.

A server initiates the procedure by sending the XTP-message-response format corresponding to the CTN-parameter update to all received XTP-message commands for a period equal to or greater than the CTN maximum-freewheel interval. In an STP-only CTN, the server increments the CTN-parameter-key field by one prior to sending the first response for the update. In a mixed CTN, the CTN-parameter-key is meaningless and is not modified by the server.

A secondary-time server sends XTP-message responses in the same format as the format of the most recent, valid XTP message response received from the server selected as the current clock source. A secondary-time server updates its local CTN parameters using information received in XTP message responses from the server selected as its clock source.

A secondary server that receives a message response containing a new scheduled CTN-parameter update stores the scheduled update parameters onto console disk storage. Additionally, when the scheduled CTN-parameter update becomes current at a server, the server stores the updated CTN parameters to console disk storage. An update is current when the timestamp specifying the time that the update is to take place is less than to or equal to the TOD clock.

Format-0 Update

A format-0 update is performed by issuing the format-0 XTP-message responses to all XTP-message-commands for a period equal to or greater than CTN maximum-freewheel interval (See above for definition). The format-0 data in the XTP message response contain the CTN-parameter update information. The update is considered complete at the end of the format-0-update interval. The update is considered to be in progress until the update completes.

While a format-0 update is in progress, other format updates cannot be performed. A busy condition is reported to console commands that attempt to a modify a CTN parameter that requires a different XTP format.

While a format-0 update is in progress, format-0 updates can continue to be performed. When a format-0 update is initiated while a format-0 update is in progress, the format-0-update interval is set to a value equal to or greater than the CTN maximum-freewheel interval.

When the CTN-parameter update is for a CTN ID update, the procedure sets the CTN-ID-update time in the new-CTN-ID block to the current time plus a value equal to or greater than the CTN maximum-freewheel interval. The update time ensures that all servers in the CTN perform the CTN-ID update at the same time.

When the CTN-parameter update is for a leap-seconds-offset update in a mixed CTN, the procedure sets the LSO-update time in the leap-seconds-offset-information block to the current time to indicate the update is to take effect immediately.

Format-1 Update

A format-1 update is performed by issuing the format-1 XTP-message response to all to all XTP-message commands for a period equal to or greater than the CTN maximum-freewheel interval. The format-1 data in the XTP message response contain the CTN-parameter update information. The update is considered complete at the end of the format-1-update interval. The update is considered to be in progress until the update completes.

While a format-1 update is in progress, other format updates cannot be performed. A busy condition is reported to console commands that attempt to a modify a CTN parameter that requires a different XTP format. In a mixed CTN, if a format-0 update for a TTO or LSO change is required while a format-1 update is in progress, the format-0 update is held pending until the format-1 update completes.

While a format-1 update is in progress, format-1 updates can continue to be performed. When a format-1 update is initiated while a format-1 update is in progress, the format-1-update interval is set to a value equal to or greater than the CTN maximum-freewheel interval.

The update time in the new-stratum-1-configuration block is set to the current time plus a value equal to or greater than the CTN maximum-freewheel interval. The update time ensures that all servers in the CTN perform the stratum-1-configuration update at the same time.

Format-2 Update

A format-2 update is performed by issuing the format-2 XTP-message response to all XTP-message-commands for a period equal to or greater than the CTN maximum-freewheel interval. The format-2 data in the XTP message response contain the CTN-parameter update information. The update is considered complete at the end of the format-2-update interval. The update is considered to be in progress until the update completes.

While a format-2 update is in progress, other format updates cannot be performed. A busy condition is reported to console commands that attempt to a modify a CTN parameter that requires a different XTP format.

While a format-2 update is in progress, format-2 updates can continue to be performed. When a format-2 update is initiated while a format-2 update is in progress, the format-2-update interval is set to a value equal to or greater than the CTN maximum-freewheel interval.

CTN ID Update Procedures

Local CTN ID Update Procedure

A local CTN-ID update procedure is provided in Applicants' assignee's system but is not relevant to the present invention which deals with global changes.

Global CTN ID Update

A global-CTN-ID update occurs at a server at the CTN-ID-update time specified in the new-CTN-ID block. The server makes the change to its CTN ID at the specified update time. Following the change, the server does not recognize CTN-ID-mismatch errors that occur as the result of mismatch between the new-CTN-ID and the former CTN-ID values for a period equal to the sync-check threshold. CTN-ID-mismatch errors that occur as the result of a mismatch other than between the new-CTN-ID and the old CTN-ID values are not ignored during this period. A configuration-change machine check condition is generated when the CTN-ID change occurs.

The active-stratum-1 server issues a configuration-change notification console command after making a CTN ID update that occurs as the result of a global-CTN-ID update.

Stratum-1 Configuration Change Procedure

A stratum-1-configuration update occurs at a server at the stratum-1-configuration-update time specified in the new-stratum-1-configuration block. The server makes the change to its stratum-1-configuration block at the specified update time. If the stratum-1-configuration block specifies a new active-stratum-1 server, the server specified as the new active-stratum-1 server sets its stratum level to one and the former stratum-1 attempts to find a clock source to operate as a secondary-time server. A configuration-change machine check condition is generated when the stratum-1-configuration change occurs.

The active-stratum-1 server issues a configuration-change notification console command after making a stratum-1-configuration update. When the stratum-1-configuration change includes a change in the active-stratum-1 server, the new active-stratum-1 server issues the command.

From the above, it is therefore seen that the present invention provides facilities which permit temporary loss of communication with a node in the network without losing timing synchronization parameters. Additionally, it is also seen that present invention allows a user to view "scheduled" events that indicate a change to a specific parameter is going to happen at a future time within any system in the timing network.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for updating parameters in a coordinated timing network, the computer program product comprising:
a non-transitory computer readable medium readable by a processor and storing instructions for execution by the processor for performing a method comprising:
receiving by a server of a coordinated timing network identified by a coordinated timing network identifier an information response packet that includes at least one parameter to be changed at the server and specifies a time at which the at least one parameter is to be changed, the at least one parameter being associated with the coordinated timing network, the coordinated timing network comprising a plurality of servers that are time synchronized and receive timing information from a stratum-1 server of the coordinated timing network;
responsive to receiving the information response packet, determining at the server whether the server is in communication with a clock source;
in response to the determining producing a negative result, waiting for a predetermined time to address a temporary loss of communication with the clock source and then determining whether the server is in communication with the clock source, wherein in response to the determining still providing a negative result, declaring one or more parameters at the server to be invalid and not changing the at least one parameter at the specified time; and
responsive to the determining indicating that the server is in communication with the clock source, changing the at least one parameter at the time at which the at least one parameter is to be changed.

2. The computer program product of claim 1, wherein the at least one parameter comprises at least one of a coordinated timing network identifier, a leap seconds offset value, a time zone offset, primary reference time information, coordinated timing network configuration information, and a daylight savings time offset.

3. The computer program product of claim 2, wherein the information response packet is in one format of a plurality of formats depending on the at least one parameter to be updated, the plurality of formats including a first format used in response to an update of the leap seconds offset value or the primary reference time information, a second format used in response to an update of the coordinated timing network identifier or the coordinated timing network configuration information, and a third format used in response to an update of the time zone offset or the daylight savings time offset.

4. The computer program product of claim 1, wherein the declaration of invalidity with respect to the one or more parameters takes place throughout said network.

5. The computer program product of claim 1, wherein the method further includes using one or more current parameters upon condition that said determining produces a positive result.

6. The computer program product of claim 1, wherein, in response to declaring the one or more parameters invalid, the method further includes requesting updated values.

7. The computer program product of claim 1, wherein the predetermined time is the maximum freewheel interval for said server performing the determining, said maximum freewheel interval being based on a maximum skew rate.

8. The computer program product of claim 1, wherein the predetermined time is the maximum freewheel interval for any server in said network, said maximum freewheel interval being based on a maximum skew rate.

9. The computer program product of claim 1, wherein the server receiving the information response packet has a same coordinated timing network identifier as a transmitting server of the information response packet.

10. The computer program product of claim 1, wherein the information response packet is transmitted, in response to detecting the at least one parameter has changed at another server, wherein the detecting uses a parameter key field of an information response packet to determine the at least one parameter has changed.

11. A computer system for updating parameters in a coordinated timing network, the computer system comprising:
   a memory; and
   a processor in communications with the memory, wherein the computer system is configured to perform a method, the method comprising:
      receiving by a server of a coordinated timing network identified by a coordinated timing network identifier an information response packet that includes at least one parameter to be changed at the server and specifies a time at which the at least one parameter is to be changed, the at least one parameter being associated with the coordinated timing network, the coordinated timing network comprising a plurality of servers that are time synchronized and receive timing information from a stratum-1 server of the coordinated timing network;
      responsive to the receiving, determining at the server whether the server is in communication with a clock source;
      in response to the determining producing a negative result, waiting for a predetermined time to address a temporary loss of communication with the clock source and then determining whether the server is in communication with the clock source, wherein in response to the determining still providing a negative result, declaring one or more parameters at the server to be invalid and not changing the at least one parameter at the specified time; and
      responsive to the determining indicating that the server is in communication with the clock source, changing the at least one parameter at the time at which the at least one parameter is to be changed.

12. The computer system of claim 11, wherein the at least one parameter comprises at least one of a coordinated timing network identifier, a leap seconds offset value, a time zone offset, primary reference time information, coordinated timing network configuration information, and a daylight savings time offset.

13. The computer system of claim 12, wherein the information response packet is in one format of a plurality of formats depending on the at least one parameter to be updated, the plurality of formats including a first format used in response to an update of the leap seconds offset value or the primary reference time information, a second format used in response to an update of the coordinated timing network identifier or the coordinated timing network configuration information, and a third format used in response to an update of the time zone offset or the daylight savings time offset.

14. The computer system of claim 11, wherein the method further includes using one or more current parameters upon condition that said determining produces a positive result.

15. The computer system of claim 11, wherein the predetermined time is the maximum freewheel interval for a server in said network, said maximum freewheel interval being based on a maximum skew rate.

16. The computer system of claim 11, wherein the server receiving the information response packet has a same coordinated timing network identifier as a transmitting server of the information response packet.

17. The computer system of claim 11, wherein the information response packet is transmitted, in response to detecting the at least one parameter has changed at another server, wherein the detecting uses a parameter key field of an information response packet to determine the at least one parameter has changed.

18. A method for updating parameters in a coordinated timing network, the method comprising:
   receiving by a server of a coordinated timing network identified by a coordinated timing network identifier an information response packet that includes at least one parameter to be changed at the server and specifies a time at which the at least one parameter is to be changed, the at least one parameter being associated with the coordinated timing network, the coordinated timing network comprises a plurality of servers that are time synchronized and receive timing information from stratum-1 server of the coordinated timing network;
   responsive to the receiving, determining at the server whether the server is in communication with a clock source;
   in response to the determining producing a negative result, waiting for a predetermined time to address a temporary loss of communication with the clock source and then determining whether the server is in communication with the clock source, wherein in response to the determining still providing a negative result, declaring one or more parameters at the server to be invalid and not changing the at least one parameter at the specified time; and
   responsive to the determining indicating that the server is in communication with the clock source, changing the at least one parameter at the time at which the at least one parameter is to be changed.

19. The method of claim 18, wherein the server receiving the information response packet has a same coordinated timing network identifier as a transmitting server of the information response packet.

20. The method of claim 18, wherein the information response packet is transmitted, in response to detecting the at least one parameter has changed at another server, wherein the detecting uses a parameter key field of an information response packet to determine the at least one parameter has changed.

* * * * *